United States Patent [19]

Weible

[11] 4,187,699

[45] Feb. 12, 1980

[54] UNIVERSAL JOINT FOR CONNECTING SHAFTS

[75] Inventor: Warren W. Weible, Defiance, Ohio

[73] Assignee: The Zeller Corporation, Defiance, Ohio

[21] Appl. No.: 935,088

[22] Filed: Aug. 21, 1978

Related U.S. Application Data

[62] Division of Ser. No. 736,863, Oct. 29, 1976, abandoned.

[51] Int. Cl.[2] .......................... F16D 3/58; F16D 3/62; F16D 3/54
[52] U.S. Cl. .......................................... 64/12; 64/19
[58] Field of Search ..................................... 64/12, 19

[56] References Cited

U.S. PATENT DOCUMENTS

| 1,406,361 | 2/1922 | Forsyth | 64/12 |
| 1,602,734 | 10/1926 | Weston | 64/12 |
| 1,716,225 | 6/1929 | Georgevitch | 64/12 |
| 4,033,144 | 7/1977 | Allen | 64/19 |

FOREIGN PATENT DOCUMENTS

| 75906 | 3/1919 | Fed. Rep. of Germany | 64/12 |
| 1260722 | 3/1960 | France | 64/12 |

*Primary Examiner*—Charles J. Myhre
*Assistant Examiner*—R. C. Turner
*Attorney, Agent, or Firm*—Allen D. Gutchess, Jr.

[57] ABSTRACT

A universal joint is provided for transmitting torque from one shaft to another, and more specifically for use with shafts where angular misalignment is not excessive. Basically, the universal joint has at least two members connected to two shafts which tend to be angularly misaligned, with each member having at least two extremities extending transversely outwardly beyond the corresponding shaft. The extremities have projections extending toward one another and flexible bridging strips are connected between the projections of the members, the strips lying substantially in a plane which is parallel to the planes in which the members rotate when the shafts are aligned. The flexible strips comprise multiplicities of substantially parallel fibers extending the lengths of the strips and are effective in tension to transmit torque from one of the shafts to the other.

6 Claims, 9 Drawing Figures

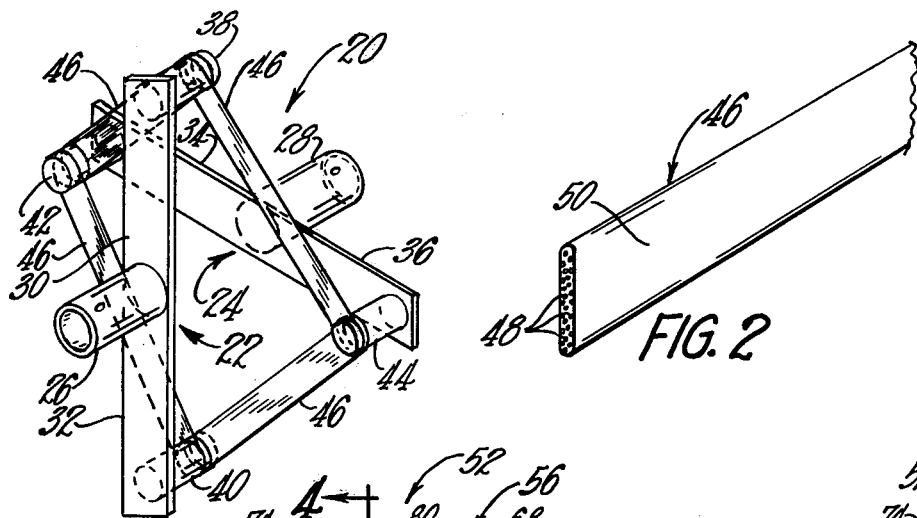
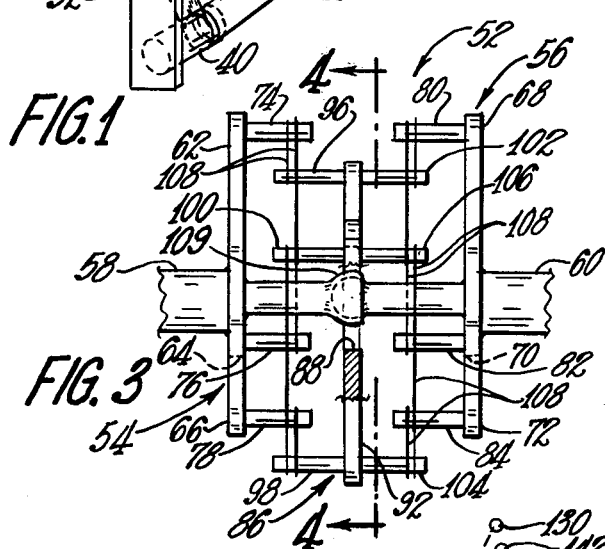
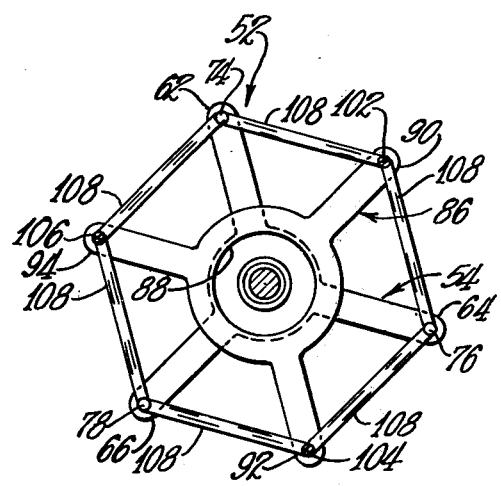
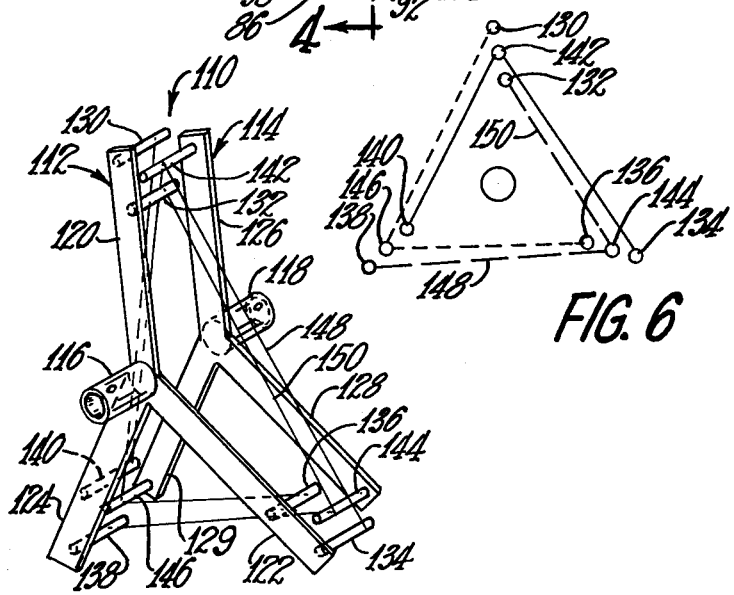

UNIVERSAL JOINT FOR CONNECTING SHAFTS

This is a division of application Ser. No. 736,863, now abandoned filed Oct. 29, 1976.

This invention relates to universal joints and particularly to universal joints for connecting shafts which are subjected to being angularly misaligned.

A wide variety of univeral joints are known in the art. Universal joints of the Cardan type have been long known in the art and are the most common ones. These have often been used at both ends of the propeller shaft located between the transmission and the differential of conventional rear-drive vehicles. With a single joint of this type, when the shafts associated therewith are angularly misaligned, the angular velocity of the one shaft relative to the other is not always constant, but this problem is reduced when these joints are used in pairs.

Constant velocity universal joints for front wheel drives as well as other applications also have long been known in the art. Such joints basically comprise a splined ball and a matching socket which enable torque to be transmitted between angularly-misaligned shafts with constant angular velocity. Such universal joints, however, have been expensive to make, being difficult to machine and also requiring great precision. Such joints have also had other shortcomings, such as deteriorating rapidly when subjected to contaminants.

Another type of universal joint that is known in the art is referred to as the bellows type. The bellows universal joints are made of thin, flexible metal of bellows shape, often with the two connected shafts having a ball and socket arrangement within the bellows at the center thereof to prevent axial offset of the shafts relative to one another. Another universal joint similar to the bellows type is of tubular configuration, usually being made of rubber and sometimes reinforced with a metal bellows within the rubber wall. These joints have also sometimes been reinforced with fibers or wires arranged in a helix or spiral, as shown in U.S. Pat. No. 3,628,352, by way of illustration. These bellows and tubular universal joints have met with limited commercial success, if any, apparently because of their inability to transmit sufficient torque and/or because of a limited service life.

The new universal joint according to the instant invention has a number of advantages over those heretofore known. The new joint has an exceptional ability to transmit torque and is believed to provide long service even under severe conditions especially when employed with shafts which are not subjected to extreme angular misalignment. It is also almost substantially maintenance free and is not affected by dirt or other contaminants. Further, no intricate machining processes or machines are required to produce the new joint. In addition, the new joint has another advantage in that it can be made in a variety of sizes and of different constructions so as to be able to replace a wide variety of existing universal joints.

The new universal joint includes at least two members, one of which is adapted to be attached to an end of one shaft and one of which is adapted to be attached to an end of a second shaft and positioned to face the first member, with the two members being in spaced relationship and positioned to rotate in substantially parallel planes when the shafts to which they are connected are axially aligned and rotated. If desired, more than two of the members can be employed to accommodate greater angular misalignment of the shafts. Each of the members has at least two extremities with each extremity having a projection extending toward the other member. Flexible elongate bridging elements or strips are connected between projections of the first and the second members and are placed in tension to transmit torque from one of the shafts to the other. In a preferred form, each of the elongate elements consists of substantially parallel graphite fibers coated with a resin or the like. The graphite fibers are particularly strong in tension, exhibit a high degree of fatigue resistance, and are capable of stretching.

It is, therefore, a principal object of the invention to provide a universal joint that is less expensive than those heretofore known, has a long life, is substantially maintenance free, is easier to manufacture, and is less affected by dirt or other contaminants.

Another object of the invention is to provide a universal joint which comprises elongate flexible elements which transmit torque from one shaft to another by the elements being placed directly in tension.

A further object of the invention is to provide a universal joint that can be used to replace a variety of existing universal joints.

Many other objects and advantages of the invention will be apparent from the following detailed description of preferred embodiments thereof, reference being made to the accompanying drawings, in which:

FIG. 1 is a schematic view in perspective of a universal joint according to the invention;

FIG. 2 is a fragmentary view in perspective of a flexible, elongate bridging element which connects two portions of the universal joint of FIG. 1 and is placed in tension to transmit torque from one shaft to another;

FIG. 3 is a schematic side view in elevation, with portions broken away and with portions in section, of a modified universal joint according to the invention;

FIG. 4 is a view in transverse cross section taken along the line 4—4 of FIG. 3;

FIG. 5 is a schematic view in perspective of another modified universal joint according to the invention;

FIG. 6 is a diagrammatic view of elongate elements connecting members of the universal joint of FIG. 5;

Figure 7:
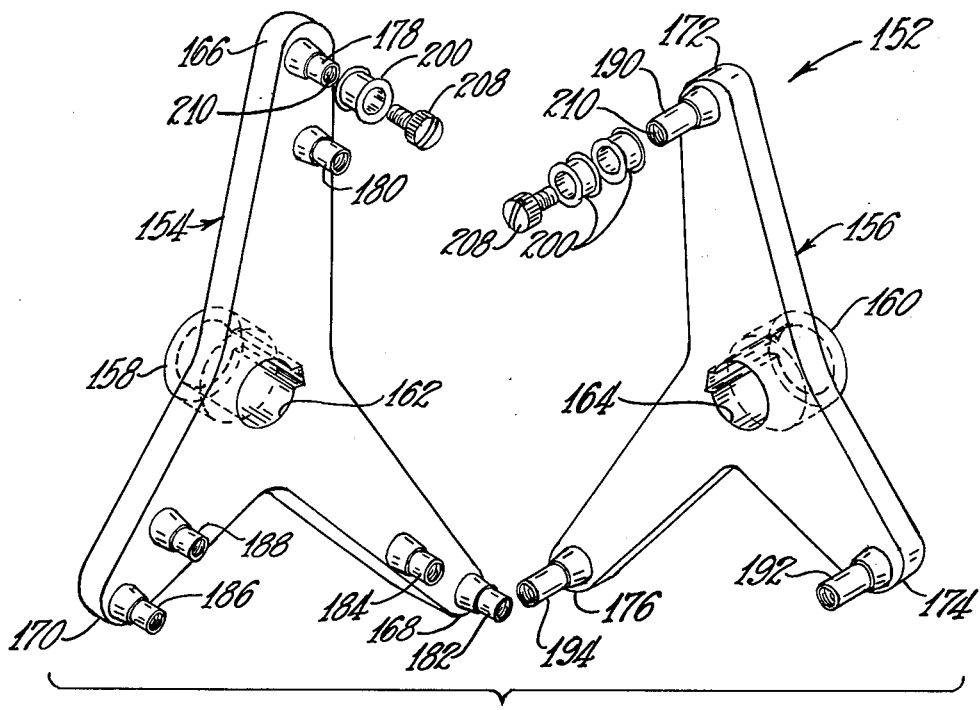
FIG. 7 is an exploded view in perspective of a commercial adaptation of the universal joint of FIG. 5.

Referring particularly to FIGS. 1 and 2, a universal joint embodying the invention is indicated at 20 and is shown ready to be connected to two shafts to enable torque or power to be transmitted from one shaft to the other, even if the shafts are angularly misaligned. The universal joint 20 can be made in a wide variety of sizes and constructions so as to be used in a wide variety of applications and also to serve as replacement universal joints for a wide variety of existing ones. The new joints are also suitable for low volume, industrial applications because the joints can be made in limited quantities since they do not require special machines, tooling, and lengthy set-up times.

The universal joint 20 includes two members 22 and 24 having means in the form of hubs 26 and 28 at central portions thereof to connect the universal joint to two shafts which may be angularly misaligned, at least at times. In this instance, the member 22 has two legs 30 and 32 extending radially outwardly from its central portion and the member 24 also has two legs 34 and 36 extending radially outwardly from its central portion. At their outer edges or extremities, substantially outwardly beyond the hub 26 and the shaft to which it would be attached, the legs 30 and 32 have projections or pins 38 and 40 facing toward the member 24. Similarly, the legs 34 and 36 have outer edges or extremities extending outwardly beyond the hub 28 and the shaft to which it would be attached, with the extremities having projections or pins 42 and 44 facing toward the member 22. The members 22 and 24 are positioned in spaced relationship and are rotatable in parallel planes when the shafts to which they are attached are aligned. The spacing of the members 22 and 24 is sufficiently close, however, that at least portions of the projections 38–44 will intersect a plane which is parallel to the planes of rotation of the members 22 and 24, and which is located between the members.

Elongate, flexible bridging elements or strips 46 connect extremities or outer edge portions of the member 22 with rotationally-displaced extremities or outer edge portions of the member 24. More specifically, the strips 46 connect each of the projections 38 and 40 of the first member 22 with the adjacent projections 42 and 44 of the second member 24, and vice versa. The strips 46, in this instance, are all of equal length and have widths substantially greater than their thicknesses, as also shown in FIG. 2, with the width being preferably from twice to ten times the thickness. The strips are positioned such that their widths lie substantially in a plane which is parallel to the rotational planes of the members 22 and 24 and which intersects all four of the projections 38–42. Actually, the strips 46 connecting the projections 38 and 44 and also 42 and 40 lie in a plane which is slightly offset from but parallel to a plane extending through the strips 46 connecting the projections 38 and 42 and also 44 and 40 to facilitate their connections with the projections. For practical and operational purposes, however, the four strips 46 all lie substantially in the same plane. With this arrangement, the flexibility of the strips is greatest in a direction parallel to the shafts to which the members 22 and 24 are connected and where the flexibility is needed when the shafts are angularly misaligned and the strips 46 must flex or bend as the members 22 and 24 rotate.

When the strips are flexed and stressed, they normally tend to assume straight positions which tends to urge the members toward positions in which the strips are straight. Thus, the strips tend to maintain the shafts to which the universal joint is connected at fixed, spaced positions in the event that the shafts are not otherwise mechanically held in fixed, spaced positions. This tendency is enhanced when the strips are stiffer.

As shown in FIG. 2, each of the strips 46 preferably consists of a plurality of substantially parallel graphite fibers 48 which are coated with resin 50 or other suitable material. As shown, the fibers are coated after they are gathered in their parallel, flat relationship but can be individually coated prior to being gathered, if desired. When the fibers are coated collectively the strips tend to be stiffer than when the fibers are individually coated and subsequently gathered into their flat strip form.

A modified universal joint according to the invention is indicated at 52 in FIGS. 3 and 4. The joint 52 differs from the joint 20 in two main respects. The joint 52 has three legs on each member instead of two, and has three members, the center one floating, instead of two. The larger number of legs employed on each of the members enables the universal joint to function closer to a true constant velocity universal joint. At the same time, however, the larger number of legs results in the length of the elongate flexible strips being shorter because, of course, the distance between the adjacent projections of the facing members is less. This tends to reduce the flexibility of the strips and, correspondingly, the extent of the angular misalignment that can be accommodated by a particular universal joint. On the other hand, the use of the three members instead of two enables the universal joint 52 to accommodate greater angular misalignment of the shafts since angular misalignment will be accommodated between the middle member and each of the end ones. With the use of three or more members, centering means preferably is employed to prevent axial misalignment of the connected shafts. This is because with two members each connected to a shaft, as shown in FIG. 1, axial misalignment of the shafts is resisted. However, with three or more members, this is not the case.

The new universal joint 52 has two outer members 54 and 56 having means in the form of hubs 58 and 60 at central portions thereof to connect the universal joint to shafts. In this instance, the member 54 has three legs 62, 64, and 66 which extend radially outwardly from its central portion of the member 54. The member 56 also has three legs 68, 70, and 72 extending radially outwardly from its central portion. At their outer edges or extremities, substantially outward from the hub 58, the legs 62, 64, and 66 have projections or pins 74, 76, and 78 facing toward the member 66. Likewise, at their outer edges or extremities, substantially outward from the hub 60, the legs 68, 70, and 72 have projections or pins 80, 82, and 84 facing toward the member 54. The members 52 and 54 are positioned in spaced relationship and are rotatable in substantially parallel planes when the shafts to which they are attached are aligned.

In this instance, in between the members 52 and 54 is a center, floating member 86. The center member 86 is not attached to any shaft but has a large opening 88 at the central portion thereof and has three legs 90, 92, and 94 extending radially outwardly from the central portion. In this instance, all nine legs are of substantially the same length. At their outer edges or extremities, substantially outward from the openings 88, the legs 90, 92, and 94 have three projections or pins 96, 98, and 100 facing toward the member 54 and have three additional projections or pins 102, 104, and 106 facing toward the member 56. The member 86 is positioned in spaced relationship to and rotatable in a plane parallel to the rotational planes of the members 54 and 56 when the shafts are aligned. The spacing of the members 54 and 86 is sufficiently close, however, that at least portions of the pins 74, 76, and 78; and 96, 98, and 100 will intersect a plane which is parallel to the rotational planes and which is located between the members 54 and 86. Likewise, the spacing of the members 86 and 56 is sufficiently close that at least portions of the pins 102, 104, and 106; and 80, 82, and 84 will intersect a plane which is parallel to the rotational planes and which is located between the members 86 and 56.

Bridging elements in the form of elongate flexible strips 108 connect outer edge portions or extremities of the member 54 with rotationally-displaced outer edge portions or extremities of the member 86. Also, the elongate flexible elements or strips 108 connect outer edge portions or extremities of the member 52 with rotationally-displaced outer edge portions or extremities of the member 86. More specifically, each of the projections of the outer member 54 is connected to the adjacent projections of the member 86 by the strips 108. Similarly, each of the projections of the outer member 56 is connected with the adjacent projections of the member 86 by the strips. The strips 108 are of equal length and have widths substantially greater than their thicknesses, as shown in FIG. 2. Again, the strips are positioned so that the widths lie substantially in planes parallel to the rotational planes of the members and which intersect the connected projections of the three members. As in FIG. 1, the strips will actually lie in slightly offset, but parallel, planes for purposes of connecting them to the projections but for practical and operational purposes, the strips are substantially in the same planes located between the center member and each of the outer ones. As discussed earlier, the joint 52 can be equipped with centering means 109, shown in the form of a ball and socket, if desired.

Referring to FIGS. 5 and 6, a modified universal joint 110 has two members and in this respect is like the universal joint of FIG. 1, but with each member having three legs and in this respect being like the universal joint of FIG. 4. With three legs, the connected shafts will rotate closer to a true constant velocity condition, as in FIGS. 3 and 4. However, the universal joint of FIGS. 5 and 6 has a distinct advantage over that of FIGS. 3 and 4 in that the elongate bridging elements or strips connecting the extremities of the legs are much longer than the strips 108 of FIGS. 3 and 4 since the outer portions or projections of the members are spaced at 120° in this instance rather than 60°. The longer length of the strips reduces the severity of the bending or flexing when the shafts are misaligned and also promotes longer service life.

The universal joint 110 includes two members 112 and 114 having means in the form of hubs 116 and 118 at central portions thereof to connect the universal joint to two shafts. The member 112 has three legs 120, 122, and 124 extending radially outwardly from the central portion of the member. The member 114 also has three legs 126, 128, and 129 extending radially outwardly from the central portion of the member. At their outer edges or extremities, the legs 120, 122, and 124, in this instance, have outer and inner projections or pins 130, 132; 134, 136; and 138, 140. All of these face toward the member 114 which has projections or pins 142, 144, and 146 at the outer edges or extremities of the legs 126, 128, and 129, respectively. In this instance, the pins 142, 144, and 146 are located between the outer and inner pins of the legs of the member 112. Also, the outer and inner pins are not radially disposed but are at slight angles to the radii, as diagrammatically shown in FIG. 6. This can provide more clearance between adjacent bridging elements, particularly those joining the outer two pins.

Elongate flexible elements or strips 148 and 150, in this instance, connect outer edge portions or extremities of the member 112 with rotationally-displaced, adjacent outer edge portions or extremities of the member 114. The steps are shown as lines in FIGS. 5 and 6 for clarity of illustration. Specifically, the longer strips 148 connect the single pins on the member 114 with the adjacent outer pins on the member 112 in a clockwise direction as viewed from one end of the universal joint 110. The shorter strips 150 connect the single pins on the member 114 with the adjacent inner pins on the member 112 in a counterclockwise direction, as viewed from the same end of the universal joint 110. With this arrangement, the strips are much longer than those employed with the three arms of the universal joint 52 of FIGS. 3 and 4 and yet they will never touch or cross one another when the shafts to which the members 112 and 114 are attached are angularly misaligned. Hence, the universal joint of FIGS. 5 and 6 has advantages of both of the universal joint designs discussed earlier.

It will be understood that additional ones of the projections or pins can be employed on the legs to extend the concept of FIGS. 5 and 6 further. Thus, for example, the legs of the member 114 can have additional pins thereon located inwardly from the inner pins of the member 112 with additional elongate flexible elements or strips then connecting the inner pins of the member 112 with the inner pins of the member 114. The member 112 also can have a third set of pins located inwardly of the inner ones to extend the concept even further.

Figure 8:
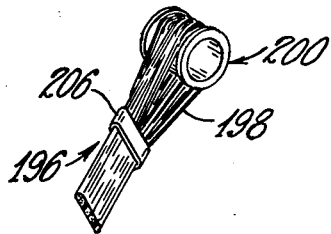
FIG. 8 is an enlarged, fragmentary view in perspective of a portion of an elongate element for connecting portions of the universal joint of FIG. 7.
Figure 9:
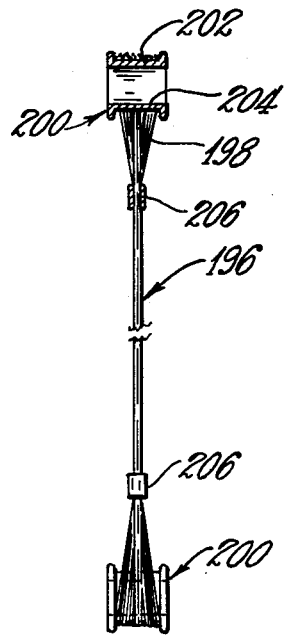
FIG. 9 is a fragmentary view in elevation, with a part in cross section, of the elongate element of FIG. 8.

FIGS. 7-9 show a more-or-less commercial embodiment of the universal joint of FIGS. 5 and 6 utilizing the same principles. Accordingly, a universal joint 152 includes two members 154 and 156 having means in the form of hubs 158 and 160 at central portions thereof to connect the universal joint to two shafts. As shown, the hubs 158 and 160 have central passages 162 and 164 designed to receive and mechanically connect the universal joint to the shafts. It will be readily understood that the particular connecting means is subject to a very wide variety of adaptations to meet the requirements for specific installations and shafts.

In this instance, each of the two members 154 and 156 is a one-piece forging with three legs 166, 168, and 170 extending radially from a central portion of the member 154 and three legs 172, 174, and 176 extending radially from a central portion of the member 156. At their outer edge portions or extremities, the legs 166, 168, and 170 have outer and inner pins 178, 180; 182, 184; and 186, 188, respectively, facing toward the member 156. Similarly, the outer edge portions or extremities if the legs 172, 174, and 176 have projections or pins 190, 192, and 194 facing toward the member 154. As with the joint of FIG. 5, the pins on the member 156 are positioned between the outer and inner pins of the member 154. The outer and inner pins are also positioned at a slight angle to a true radius, as in FIGS. 5 and 6.

With the members 154 and 156 being forgings, the projections or pins are structurally integral with the legs. Further, the forgings require relatively little machining, only that necessary for the passages 162 and 164 and for the end portions of the pins.

The universal joint 152 employs two lengths of bridging elements or strips, similar to those shown in FIG. 6. All of the elements or strips are of the same construction, as particularly shown in FIGS. 9 and 10, where a strip is indicated at 196. In a preferred form, the strip 196 consists of a multiplicity of graphite fibers 198 which can be coated with a suitable resin and with additional resin added after the fibers are collected, if desired. The graphite fibers are advantageous because they are strong in tension, are fatique resistant, and can stretch to some extent. They are commercially available in tows, strands or untwisted yarn consisting of 2,000, 5,000 or 10,000 fibers or filaments in cross section. The coating material employed can be an epoxy resin and a hardener or SMC material, by way of illustration.

The fibers 198 are wound around end bushings or connections 200 and specifically around grooves 202 therein. The bushings 200 also have central bores or passages 154 and 156.

Near the bushings 200, the fibers 198 are provided with a clip or band 206 which gather the fibers and maintain their flattened configuration similar to the strips of FIGS. 1 and 2 so that the fibers 198 are in planes extending substantially parallel to the planes of rotation of the members 154 and 156. Again, this provides flexibility in the desired direction as discussed with regard to FIGS. 1 and 2. Particularly, when the fibers are heavily coated to provide structural integrity for the strip, the bands can be removed when the coating material has hardened.

When the fibers with their bushings are assembled with the members 154 and 156, the bushings 200 are received on the pins and are then rotatably held thereon by suitable fasteners such as cap screws 208 which are threaded into tapped bores 210 in the ends of the pins. The machined portions of the pins 190, 192, and 194 of the member 156 are longer than the corresponding portions of the projections or pins of the member 154 because two of the bushings 200 are received on each of the pins 190, 192, and 194 to accommodate the two strips extending to the outer and inner pins of the member 154.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A universal joint for transmitting torque from one shaft to another shaft, said universal joint comprising a first member, means for attaching a central portion of said first member to an end of one of said shafts to be positioned transversely to the longitudinal extent of said shaft, a second member, means for attaching a central portion of said second member to an end of the other of said shafts to be positioned transversely to the longitudinal extent of said other shaft, said first member having at least three first extremities extending transversely outwardly beyond the shaft, said second member having at least three second extremities extending transversely outwardly beyond the other shaft, each of the first extremities of said first member having a first projection extending toward said second member, said first projections being at the same distance from the central portion of said first member, each of said second extremities having two second projections, including an outer second projection and an inner second projection, said outer second projections being at the same distance from the central portion of said second member, which distance is more than the distance of said first projections, said inner second projections being at the same distance from the central portion of said second member, which distance is less than the distance of said first projections, and flexible bridging means connecting rotationally-spaced first and second projections of said members, said bridging means connecting said first projections to rotationally displaced inner second projections in one direction and to outer rotationally spaced second projections in the other direction.

2. A universal joint according to claim 1 characterized by said bridging means extending between said projections being flexible strips.

3. A universal joint for transmitting torque from one shaft to another shaft, said universal joint comprising a first member, means for connecting a central portion of said first member to one of said shafts to be positioned transversely to the longitudinal extent of said shaft, a second member, means for connecting a central portion of said second member to the other of said shafts to be positioned transversely to the longitudinal extent of said other shaft, said first member having extremities extending transversely outwardly beyond the other shaft, each of the extremities of said first member having two projections extending toward said second member, the two projections being an outer projection and an inner projection with all of the outer projections being substantially at the same distance from said connecting means for said first member and all of the inner projections being substantially at the same distance from said connecting means for said first member, each of the extremities of said second member having a second projection extending toward said first member with all of said second projections being substantially at the same distance from said connecting means for said second member, the last distance being more than the distance from said inner projections to the first member connecting means and less than the distance from said outer projections to the first member connecting means, and bridging means extending between said second projections and the adjacent inner projections which are rotationally displaced in a clockwise direction as viewed from one end of the joint, and said bridging means extending from said second projections to the adjacent outer projections which are rotationally displaced in a counterclockwise direction as viewed from the same end of the joint.

4. A universal joint according to claim 3 characterized by said bridging means comprising flexible strips having their wide transverse dimension positioned in a plane extending substantially parallel to rotational planes of said first and said second members when the shafts are aligned.

5. A universal joint according to claim 4 characterized by each of said flexible strips comprising graphite fibers arranged in generally parallel, longitudinal relationship with respect to the strip, said fibers having a coating thereon.

6. A universal joint according to claim 3 characterized by each of said first and second members having three of said extremities extending outwardly beyond the shaft.

* * * * *